(12) United States Patent
Ishikawa et al.

(10) Patent No.: US 12,366,199 B1
(45) Date of Patent: Jul. 22, 2025

(54) POWER UNIT

(71) Applicant: ISHIKAWA ENERGY RESEARCH CO., LTD., Ota (JP)

(72) Inventors: Mitsuru Ishikawa, Ota (JP); Masakazu Yamazaki, Ota (JP)

(73) Assignee: ISHIKAWA ENERGY RESEARCH CO., LTD., Ota (JP)

( * ) Notice: Subject to any disclaimer, the term of this patent is extended or adjusted under 35 U.S.C. 154(b) by 0 days.

(21) Appl. No.: 18/871,629

(22) PCT Filed: May 18, 2023

(86) PCT No.: PCT/JP2023/018570
§ 371 (c)(1),
(2) Date: Apr. 9, 2025

(87) PCT Pub. No.: WO2024/009624
PCT Pub. Date: Jan. 11, 2024

(30) Foreign Application Priority Data

Jul. 4, 2022 (JP) .................................. 2022-107973

(51) Int. Cl.
*F02B 63/04* (2006.01)
*H02K 7/18* (2006.01)
*H02K 21/24* (2006.01)

(52) U.S. Cl.
CPC ......... *F02B 63/042* (2013.01); *H02K 7/1815* (2013.01); *H02K 21/24* (2013.01)

(58) Field of Classification Search
CPC ...... F02B 63/042; H02K 7/1815; H02K 21/24
See application file for complete search history.

(56) References Cited

U.S. PATENT DOCUMENTS

2021/0320576 A1* 10/2021 Monteith ................ F03D 3/005

FOREIGN PATENT DOCUMENTS

| CN | 101532426 A | 9/2009 |
|---|---|---|
| CN | 104953764 A | 9/2015 |
| CN | 109586534 A | 4/2019 |
| JP | 2002-247822 A | 8/2002 |

(Continued)

OTHER PUBLICATIONS

Office Action dated Mar. 10, 2025, issued in counterpart CN Application No. 202380042161.4, with English translation. (10 pages).

(Continued)

*Primary Examiner* — Sean Gugger
(74) *Attorney, Agent, or Firm* — WHDA, LLP (57) ABSTRACT

Provided is a power unit that allows a stator and a rotor of an axial flux power generator forming the power unit to be brought closer to each other in a simple configuration. An engine 11 of the power unit 10 includes an engine-side shaft 15 configured to output a drive force by rotating about a rotational axis 14. The axial flux power generator 12 includes a stator 16, a first rotor 17 rotatably arranged on one side of the stator 16, a second rotor 18 rotatably arranged on the other side of the stator 16, and a power-generator-side shaft 19 that is connected to rotation centers of the first rotor 17 and the second rotor 18 and that is continuous with the engine-side shaft 15. The engine-side shaft 15 comes into contact with a thrust fixation part 131 along the rotational axis 14.

6 Claims, 4 Drawing Sheets

(56) References Cited

FOREIGN PATENT DOCUMENTS

| JP | 2005-218263 A | 8/2005 |
| JP | 2012-125021 A | 6/2012 |
| JP | 2014-114767 A | 6/2014 |
| JP | 2014-173563 A | 9/2014 |
| JP | 2015-21410 A | 2/2015 |

OTHER PUBLICATIONS

International Search Report dated Jul. 18, 2023, issued in counterpart International Application No. PCT/JP2023/018570, with English Translation. (5 pages).

Written Opinion dated Jul. 18, 2023, issued in counterpart Application No. PCT/JP2023/018570. (4 pages).

Notice of Reasons for Refusal dated Aug. 9, 2022, issued in counterpart JP Application No. 2022-107973, with English translation. (9 pages).

\* cited by examiner

POWER UNIT

TECHNICAL FIELD

The present invention relates to a power unit.

BACKGROUND ART

There has been heretofore a power unit in which an engine and a power generator are integrated. The power generator adopted in the power unit includes a radial power generator and an axial power generator. The axial power generator is referred to as axial flux power generator. Since size reduction of the axial flux power generator is easier than that of the radial power generator, the axial flux power generator is mounted in small devices in many cases.

Patent Literature 1 describes an example of the axial flux power generator. In the power generator described in Patent Literature 1, a rotor and a stator having substantially-disc shapes are arranged to face each other in an axial direction. Then, the rotor rotates to generate an induced current by means of electromagnetic induction, and an electric power is thereby generated.

CITATION LIST

Patent Literature

Patent Literature 1: Japanese Patent Application Publication No. 2012-125021

SUMMARY OF THE INVENTION

Problem to be Solved by the Invention

However, when a power unit is configured by using the invention described in the above-mentioned Patent Literature 1 or the like, increasing output efficiency of a power generator attached to an engine is not easy.

Specifically, in the power unit, a crankshaft of the engine and a rotating shaft of the axial flux power generator are couped to each other to transmit a drive force on the engine side to the power generator side. In this case, in order to improve the power generation efficiency of the axial flux power generator, it is important to bring a stator and a rotor as close as possible to each other in a direction along the rotating shaft. Meanwhile, the crankshaft of the engine is installed in an engine main body with a certain tolerance provided in the axial direction for assembly of parts. Accordingly, when the crankshaft of the engine and the shaft of the axial flux power generator are coupled to each other, the position of the rotor of the axial flux power generator is not uniquely determined in the axial direction. This causes a problem of bringing the stator and the rotor of the axial flux power generator close to each other not being easy.

The present invention has been made in view of such a problem, and an object of the present invention is to provide a power unit that allows a stator and a rotor of an axial flux power generator forming the power unit to be brought closer to each other in a simple configuration.

Means for Solving the Problem

A power unit of the present invention includes: an engine; an axial flux power generator configured to be driven by the engine; and a thrust fixation part, the engine includes an engine-side shaft configured to output a drive force by rotating about a rotational axis, the axial flux power generator includes a stator, a first rotor rotatably arranged on one side of the stator, a second rotor rotatably arranged on the other side of the stator, and a power-generator-side shaft that is connected to rotation centers of the first rotor and the second rotor and that is continuous with the engine-side shaft, and the engine-side shaft comes into contact with the thrust fixation part along the rotational axis.

Moreover, a power unit of the present invention includes: an engine; an axial flux power generator configured to be driven by the engine; and a thrust fixation part, the engine includes an engine-side shaft configured to output a drive force by rotating about a rotational axis, the axial flux power generator includes a stator, a rotor arranged near the stator, and a power-generator-side shaft that is connected to a rotation center of the rotor and that is continuous with the engine-side shaft, the engine-side shaft comes into contact with the thrust fixation part along the rotational axis, the engine-side shaft comes into contact with the thrust fixation part by being biased by a biasing part, the engine-side shaft includes a first thrust contact part arranged at a position close to the axial flux power generator and a second thrust contact part arranged at a position farther away from the axial flux power generator than the first thrust contact part is, and the biasing part comes into contact with the first thrust contact part and biases the first thrust contact part to bring the second thrust contact part into contact with the thrust fixation part.

Effects of the Invention

According to the power unit of the present invention, the engine-side shaft comes into contact with the thrust fixation part. Accordingly, positions of the first rotor and the second rotor in the axial direction are set to predetermined positions via the power-generator-side shaft continuous with the engine-side shaft. Thus, a clearance between the stator and each of the first rotor and the second rotor can be set to a predetermined length, and power generation efficiency of the axial flux power generator can be improved.

MODES FOR CARRYING OUT THE INVENTION

A power unit 10 according to an embodiment of the present invention is explained below in detail based on the drawings. In the following explanation, the same members are basically denoted by the same reference numerals, and repeated explanation is omitted.

Figure 1A:
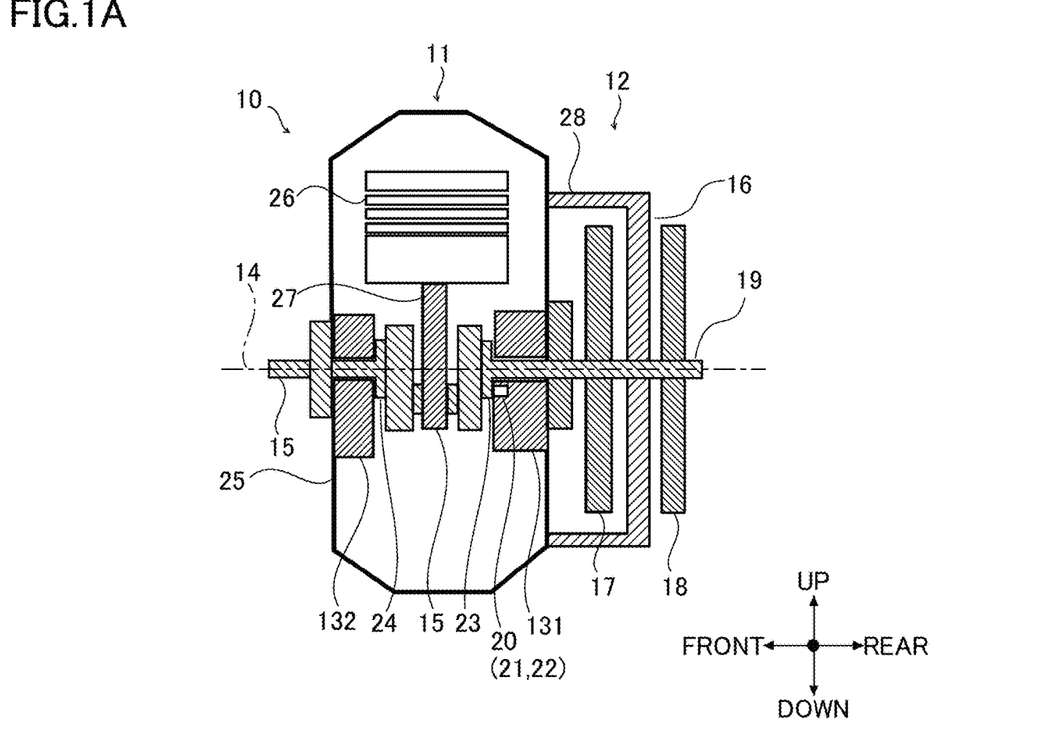
FIG. 1A is a cross-sectional view illustrating a power unit according to an embodiment of the present invention.
Figure 1B:
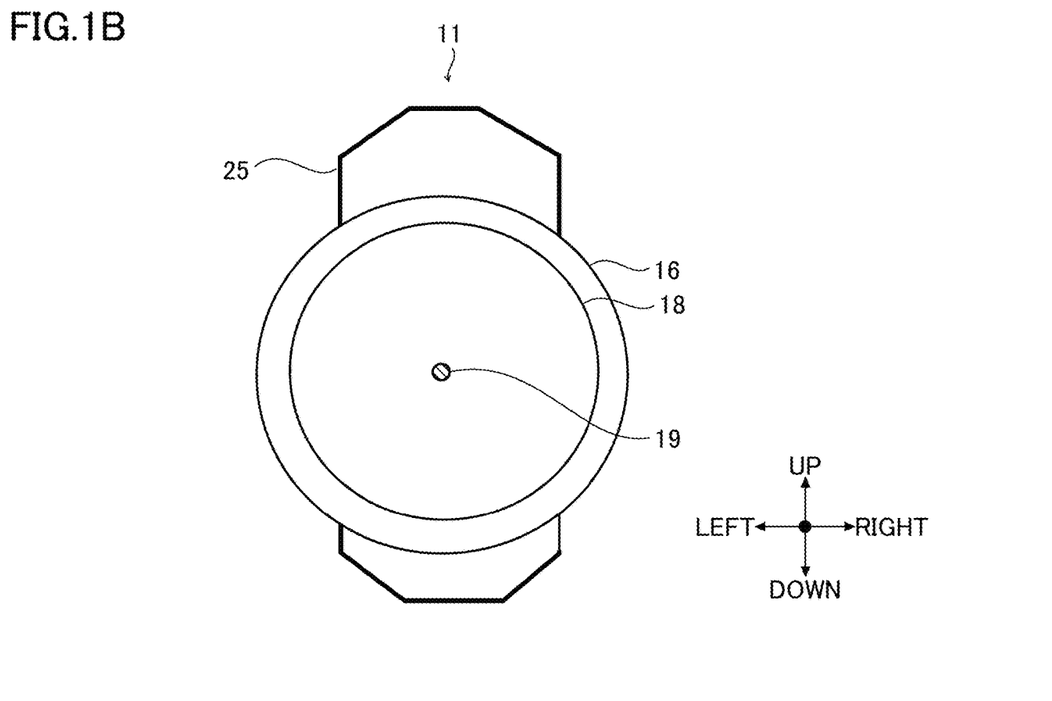
FIG. 1B is a rear view illustrating the power unit according to the embodiment of the present invention.

FIG. 1A is a cross-sectional view illustrating the power unit 10. FIG. 1B is a rear view illustrating the power unit 10.

The power unit 10 includes an engine 11, an axial flux power generator 12 driven by the engine 11, and a thrust fixation part 132. When the power unit 10 runs, the engine 11 rotationally drives the axial flux power generator 12, and the axial flux power generator 12 outputs an AC power. The power unit 10 is used as a power source of a flight apparatus, a vehicle, or the like. The axial flux power generator 12 can achieve both of size reduction and output increase at a higher level than a radial power generator. Accordingly, applying the axial flux power generator 12 to a flight apparatus such as a drone can reduce the weight of the flight apparatus, and can also extend a continuous flight distance of the flight apparatus.

In this example, a single-cylinder engine is described as an example of the engine 11. The engine 11 mainly includes a casing 25, a piston 26, an engine-side shaft 15, and a connecting rod 27. When the engine 11 runs, the piston 26 reciprocates by repeating a compression stroke, an explosion stroke, an exhaust stroke, and an intake stroke. The engine-side shaft 15 connected to the piston 26 by the connecting rod 27 converts reciprocating motion to rotating motion. The engine-side shaft 15 outputs a drive force by rotating about a rotational axis 14. Moreover, the engine-side shaft 15 includes a first thrust contact part 23 and a second thrust contact part 24. A specific configuration of the engine-side shaft 15 is described later with reference to FIG. 2A.

A thrust fixation part 131 and the thrust fixation part 132 are parts that are arranged inside the casing 25 and that fix the engine-side shaft 15 in an axial direction. A portion of the engine-side shaft 15 that extends rearward is inserted into the thrust fixation part 131. A not-illustrated bearing is interposed between the thrust fixation part 131 and the engine-side shaft 15. A portion of the engine-side shaft 15 that extends forward is inserted in the thrust fixation part 132. A not-illustrated bearing is interposed between the thrust fixation part 132 and the engine-side shaft 15.

A biasing part 20 is arranged in the thrust fixation part 131. The biasing part 20 is a part that is arranged on the front face side of the thrust fixation part 131 and that biases the first thrust contact part 23 of the engine-side shaft 15 forward. For example, a piston part 21, a spring 22, or the like to be described later can be adopted as the biasing part 20.

The piston part 21 is a part that biases the first thrust contact part 23 by using pressure of an oil pump that is an accessory of the engine 11 not-illustrated herein. The oil pump forms an oil supply path through which oil is supplied to a main journal of the engine-side shaft 15. The piston part 21 receives the pressure from a branch path branching from the oil supply path, and biases the first thrust contact part 23. Adopting the piston part 21 as the biasing part 20 can eliminate the need for a dedicated device for generating the biasing force, and enables obtaining of large biasing force. The biasing part 20 is described later with reference to FIG. 3B.

The spring 22 is, for example, a coil spring with an axis extending in a front-rear direction. A restoring force of the coil spring biases the first thrust contact part 23 forward. An elastic body other than the coil spring such as, for example, an elastic synthetic resin such as rubber can be adopted as the spring 22. Adopting the spring 22 as the biasing part 20 enables obtaining of the biasing force with a simple configuration.

The axial flux power generator 12 includes a stator 16, a first rotor 17, a second rotor 18, and a power-generator-side shaft 19. In this example, the axial flux power generator 12 is arranged right behind the engine 11, and is fixed to the casing 25 of the engine 11.

The stator 16 is connected to the casing 25 of the engine 11 via a stator fixation part 28, and the position of the stator 16 is thereby fixed. Multiple coils are arranged in a circumferential direction in the stator 16.

The first rotor 17 is rotatably arranged on the front side that is one side of the stator 16. Multiple permanent magnets are arranged in the circumferential direction in the first rotor 17.

The second rotor 18 is rotatably arranged on the rear side that is the other side of the stator 16. Multiple permanent magnets are arranged in the circumferential direction in the second rotor 18.

A gap between the first rotor 17 and the stator 16 is set to be extremely small to improve power generation efficiency of the axial flux power generator 12. Similarly, a gap between the second rotor 18 and the stator 16 is set to be extremely small. In the present embodiment, the engine-side shaft 15 is aligned in the axial direction to stably reduce the lengths of these gaps. Such matters are explained with reference to FIGS. 2A and 2B.

The power-generator-side shaft 19 is a substantially-rod shaped member connected to the rotation centers of the first rotor 17 and the second rotor 18 to be unrotatable relative to the first rotor 17 and the second rotor 18. Moreover, the power-generator-side shaft 19 forms a linear rod-shaped rotating member continuous and integral with the engine-side shaft 15.

Figure 2A:
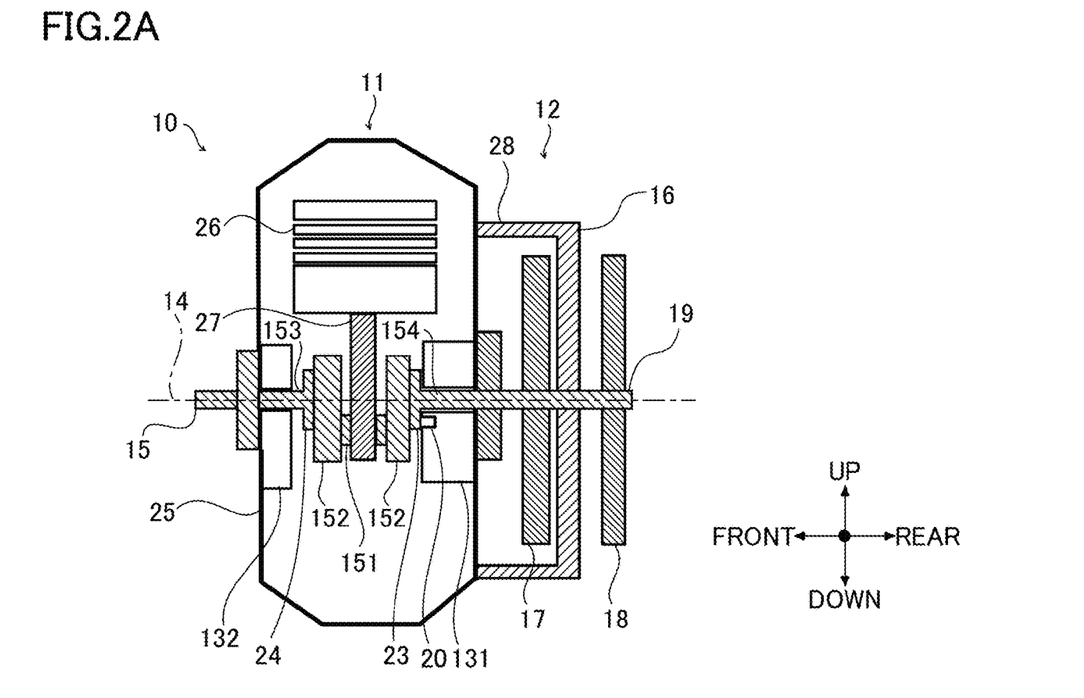
FIG. 2A is a cross-sectional view illustrating the power unit according to the embodiment of the present invention.

FIG. 2A is a cross-sectional view illustrating a state before biasing by the biasing part 20. Moreover, a configuration of the engine-side shaft 15 is described in detail with reference to FIG. 2A.

The engine-side shaft 15 includes a pin part 151, arm parts 152, a front extending part 153, and a rear extending part 154. The pin part 151 is rotatably connected to a lower portion of the connecting rod 27. The arm parts 152 are arranged on both sides of the pin part 151, and connect the pin part 151 to the front extending part 153 and the rear extending part 154. The front extending part 153 penetrates the thrust fixation part 132, and extends forward. The rear extending part 154 penetrates the thrust fixation part 131, and is connected to the power-generator-side shaft 19.

The first thrust contact part 23 is a part in which the diameter of the rear extending part 154 of the engine-side shaft 15 is increased partially in the axial direction. The first thrust contact part 23 is formed by increasing the diameter of the substantially-cylindrical rear extending part 154 across the entire circumference. In the case where the biasing part 20 is the piston part 21 to be described later, the biasing part 20 does not bias the first thrust contact part 23 in non-running of the power unit 10.

The second thrust contact part 24 is a part in which the diameter of the front extending part 153 of the casing 25 is increased partially in the axial direction. The second thrust contact part 24 is formed by increasing the diameter of the substantially-cylindrical front extending part 153 across the entire circumference. When the power unit 10 is not running, the biasing part 20 does not bias the first thrust contact part 23 forward as described above, and a front face of the second thrust contact part 24 is thus not in contact with a rear face of the thrust fixation part 132.

Figure 2B:
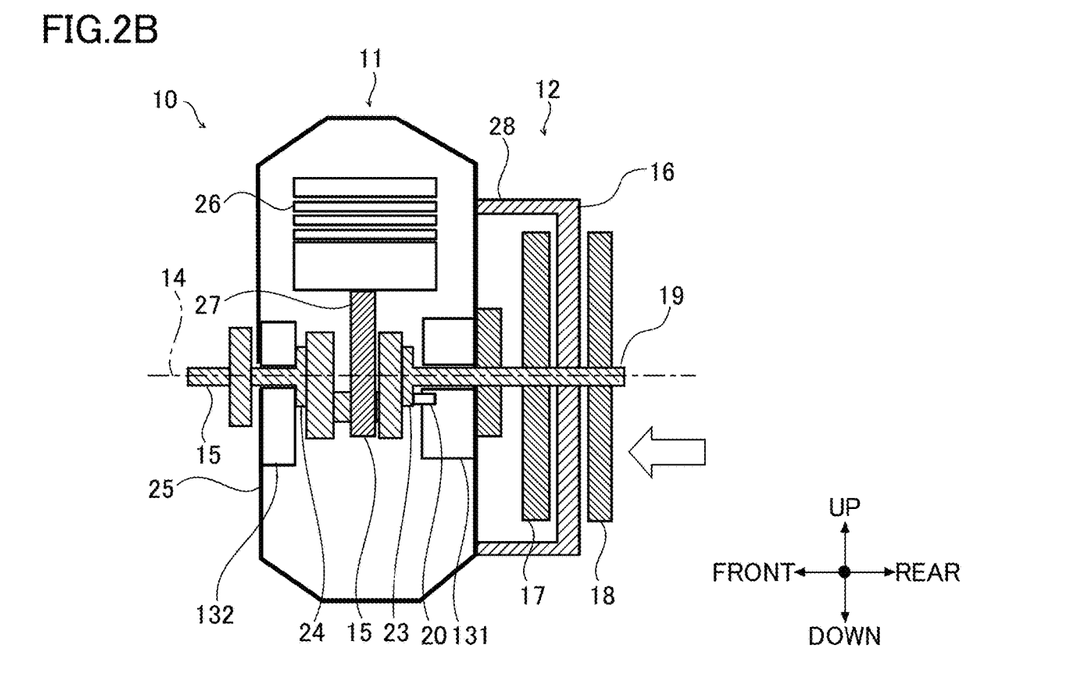
FIG. 2B is a cross-sectional view illustrating the power unit according to the embodiment of the present invention.

FIG. 2B is a cross-sectional view illustrating a state in which the biasing by the biasing part 20 is performed.

Running of the engine 11 causes pressure from a hydraulic circuit to be applied to the biasing part 20, and the biasing part 20 biases a rear face of the first thrust contact part 23 of the engine-side shaft 15 forward. Then, the engine-side shaft 15 and the power-generator-side shaft 19 are shifted forward, and the front face of the second thrust contact part 24 comes into contact with the rear face of the thrust fixation part 132. This causes the power-generator-side shaft 19 continuous with the engine-side shaft 15 and, therefore, the first rotor 17 and the second rotor 18 to be located at predetermined positions. Accordingly, the gap between the first rotor 17 and the stator 16 and the gap between the second rotor 18 and the stator 16 are set to predetermined lengths.

Specifically, when the first rotor 17, the stator 16, and the second rotor 18 of the axial flux power generator 12 go into the state illustrated in FIG. 2B, the first rotor 17, the stator 16, and the second rotor 18 are arranged such that the gaps between these members are design values.

Accordingly, when the first rotor 17 and the second rotor 18 rotate in this state, AC power can be efficiently generated by an electromagnetic action of the stator 16 and each of the second rotor 18 and the second rotor 18.

Figure 3A:
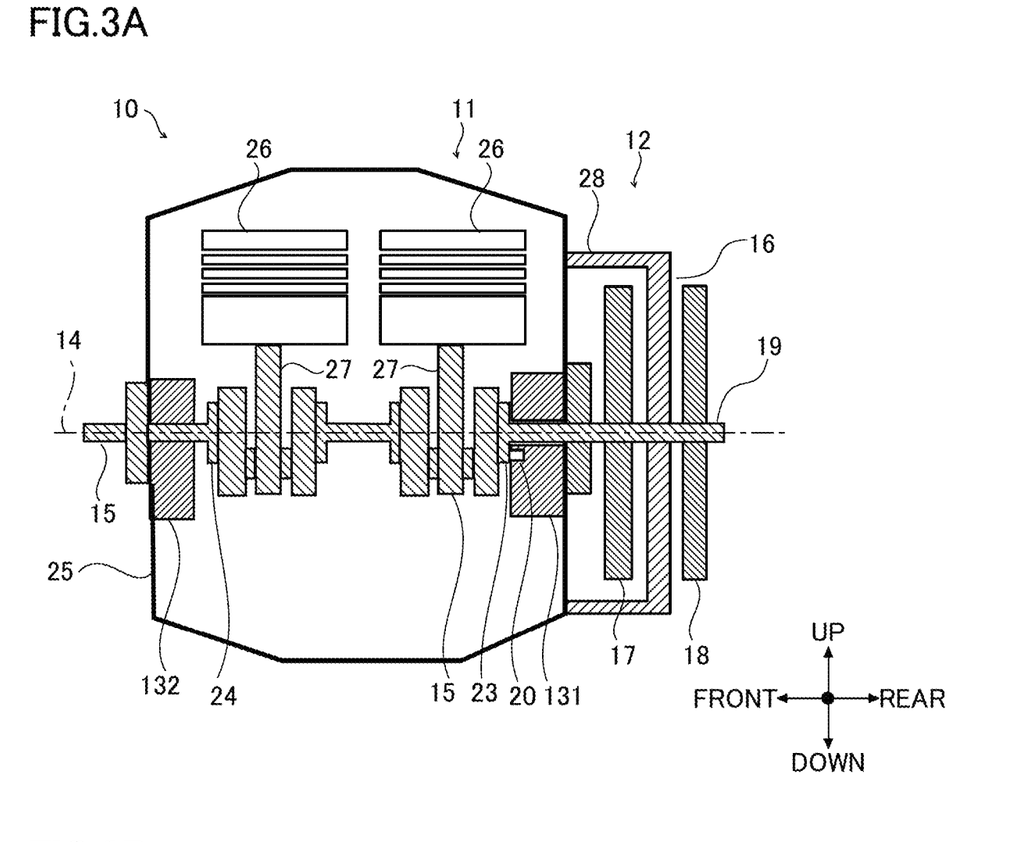
FIG. 3A is a cross-sectional view illustrating a power unit according to another mode of the present invention.

FIG. 3A is a cross-sectional view illustrating a power unit 10 according to another mode. The engine 11 of the power unit 10 illustrated in FIG. 3A is a two-cylinder engine including two pistons. Specifically, two pistons 26 and two connecting rods 27 are attached to one engine-side shaft 15. Other configurations are the same as those in the power unit 10 illustrated in FIG. 2A and the like. Also in such a configuration, causing the biasing part 20 to bias the first thrust contact part 23 forward in the running of the power unit 10 brings the second thrust contact part 24 into contact with the thrust fixation part 132. This causes the gap between the first rotor 17 and the stator 16 and the gap between the second rotor 18 and the stator 16 to be the predetermined distances in the axial flux power generator 12. Accordingly, the axial flux power generator 12 can efficiently generate power.

Figure 3B:
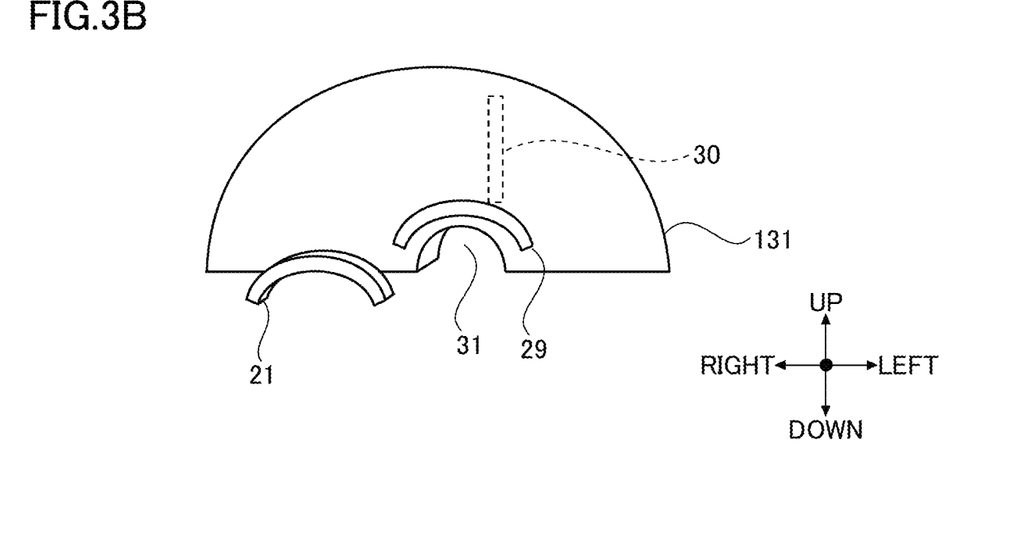
FIG. 3B is a perspective view illustrating a piston part and the like according to the embodiment of the present invention.

FIG. 3B is a perspective view illustrating the piston part 21 of the power unit 10 according to the other mode. In FIG. 3B, only an upper portion of the thrust fixation part 131 is illustrated.

An insertion hole 31 and a piston housing portion 29 are formed in the thrust fixation part 131. The insertion hole 31 is a through-hole in which the rear extending part 154 being part of the engine-side shaft 15 described above is inserted. The piston housing portion 29 is a cavity formed by carving out a portion of the thrust fixation part 131 on the outer side of the insertion hole 31 in a substantially-arch shape. The piston part 21 is a member having a substantially-arch shape like the piston housing portion 29, and is housed in the piston housing portion 29. The face of the piston part 21 facing the viewer on the drawing sheet comes into contact with the above-mentioned first thrust contact part 23, and biases the first thrust contact part 23

Pressure is applied to the piston part 21 from a hydraulic circuit 30. The hydraulic circuit 30 is a circuit through which the oil is supplied from the above-mentioned oil pump to the engine-side shaft 15. Forming the piston part 21 in the arch shape can bias the above-mentioned engine-side shaft 15 more stably.

Figure 4:
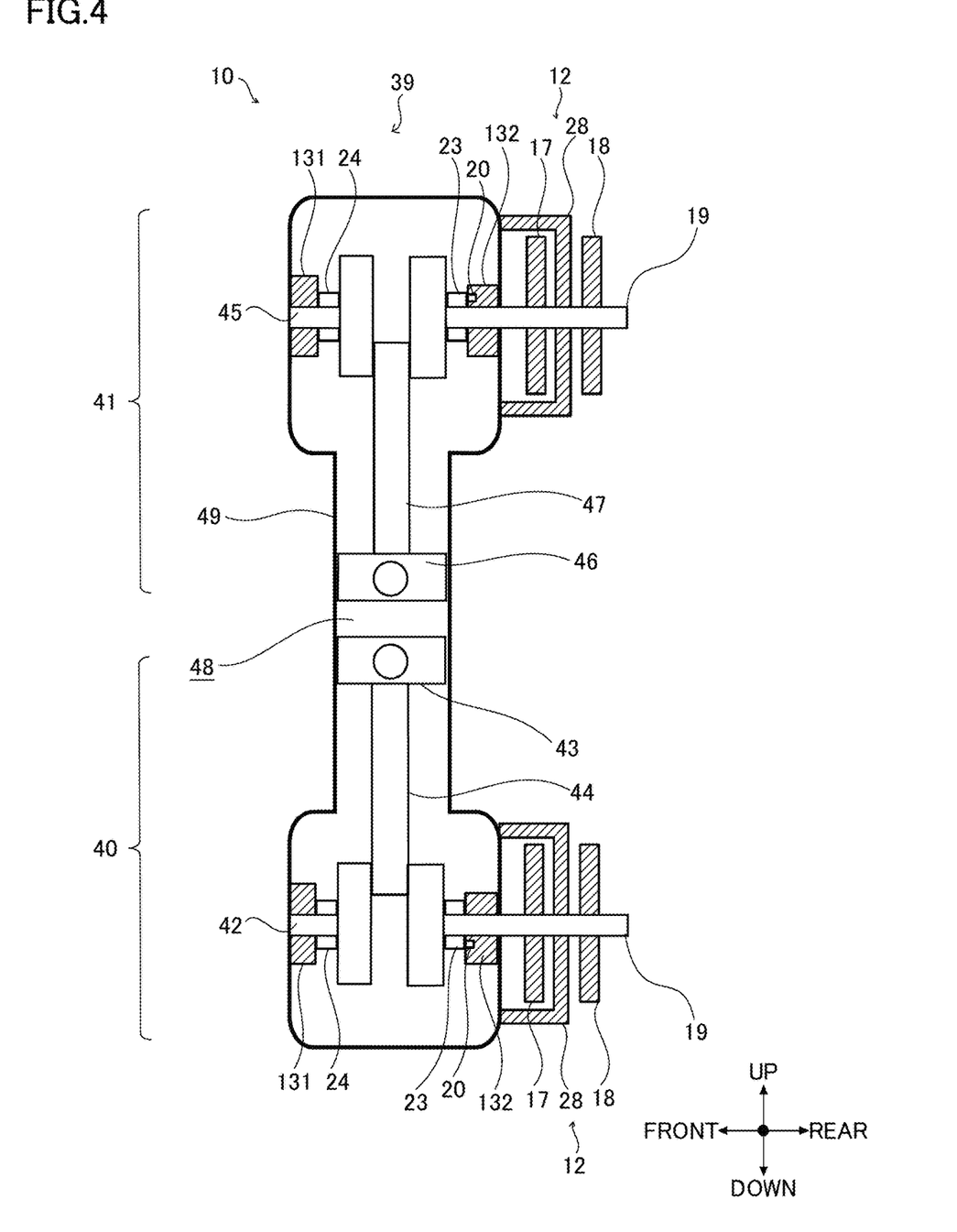
FIG. 4 is an enlarged cross-sectional view illustrating a power unit according to yet another mode of the present invention.

FIG. 4 is an enlarged cross-sectional view illustrating the power unit 10 according to yet another mode. A basic configuration of the power unit 10 illustrated in FIG. 4 is similar to that illustrated in FIG. 1, and is different in a configuration of an engine 39.

The engine 39 includes a first engine part 40 and a second engine part 41. The first engine part 40 and the second engine part 41 are arranged to be opposed each other. Moreover, the axial flux power generators 12 are arranged to correspond to the first engine part 40 and the second engine part 41, respectively. Such a configuration can increase a power generation amount of the power unit 10 as a whole.

The first engine part 40 includes a first piston 43 that reciprocates, a first crankshaft 42 that converts the reciprocating motion of the first piston 43 to rotating motion, and a first connecting rod 44 that rotatably connects the first piston 43 and the first crankshaft 42 to each other.

The second engine part 41 includes a second piston 46 that reciprocates, a second crankshaft 45 that converts the reciprocating motion of the second piston 46 to rotating motion, and a second connecting rod 47 that rotatably connects the second piston 46 and the second crankshaft 45 to each other.

The first piston 43 of the first engine part 40 and the second piston 46 of the second engine part 41 share a combustion chamber 48. In other words, the first piston 43 and the second piston 46 reciprocate inside one communicating cylinder 49. Accordingly, simultaneous stroking of the first engine part 40 and the first piston 43 toward a center portion can achieve a high compression ratio of a mixed gas in the combustion chamber 48 while reducing a stoke amount.

Although not illustrated herein, a volumetric space communicating with the combustion chamber 48 is formed in the engine 39, and a spark plug is arranged in this volumetric space. Moreover, an intake port and an exhaust port that are not illustrated herein are formed in the combustion chamber 48. The mixed gas containing fuel such as gasoline is introduced into the combustion chamber 48 from the intake port, and an exhaust gas after combustion is exhausted from the combustion chamber 48 to the outside via the exhaust port.

In this case, the first crankshaft 42 of the first engine part 40 is integrally connected to the power-generator-side shaft 19 of the axial flux power generator 12. Meanwhile, the second crankshaft 45 of the second engine part 41 is integrally connected to the power-generator-side shaft 19 of the other axial flux power generator 12.

The engine 39 with the above-mentioned configuration operates as follows. First, in the intake stroke, the first piston 43 and the second piston 46 move outward from the center portion in the cylinder 49 to introduce the mixed gas that is a mixture of fuel and air, into the cylinder 49. Next, in the compression stroke, inertia of the rotating first crankshaft 42 and second crankshaft 45 causes the first piston 43 and the second piston 46 to be pushed toward the center portion, and the mixed gas is compressed in the cylinder 49. Next, in the combustion step, the not-illustrated spark plug ignites the mixed gas in the combustion chamber 48 to combust the mixed gas in the cylinder 49, and this causes the first piston 43 and the second piston 46 to be pushed toward outer end portions that are bottom dead centers. Then, in the exhaust stroke, the inertia of the rotating first crankshaft 42 and second crankshaft 45 causes the first piston 43 and the second piston 46 to be pushed inward, and the gas after combustion remaining in the cylinder 49 is exhausted to the outside.

In the engine 39, the stroke can be divided between the two pistons of the first piston 43 and the second piston 46 that reciprocate inside one cylinder 49. Accordingly, the compression ratio of the mixed gas can be increased from that in a normal gasoline engine. Moreover, since the first piston 43 and the second piston 46 are opposed to each other inside the cylinder 49, a cylinder head required in a general engine is unnecessary, and the configuration of the engine 39 is simple and lightweight. Moreover, the members forming the engine 39, specifically, the first piston 43, the second piston 46, the first crankshaft 42, the second crankshaft 45, and the like are arranged to be opposed to one another, and operate in an opposing manner. Accordingly, vibrations generated from the members of the engine 39 cancel out one another, and a vibration generated from the entire engine 39 to the outside can be reduced. Hence, mounting the engine 39 with such a structure in the flight apparatus can achieve size reduction, weight reduction, and vibration reduction of the flight apparatus. Particularly, the vibration reduction can prevent adverse effects on delicate devices such as a GPS sensor and a computation control device for attitude control, motor output control, and the like. Moreover, the vibration reduction can prevent the case where the vibration damages a delivery cargo transported by the flight apparatus.

An invention that can be grasped from the above-mentioned present embodiment is explained below together with effects of this invention.

A power unit of the present invention includes an engine, an axial flux power generator configured to be driven by the engine, and a thrust fixation part, the engine includes an engine-side shaft configured to output a drive force by rotating about a rotational axis, the axial flux power generator includes a stator, a first rotor rotatably arranged on one side of the stator, a second rotor rotatably arranged on the other side of the stator, and a power-generator-side shaft that is connected to rotation centers of the first rotor and the second rotor and that is continuous with the engine-side shaft, and the engine-side shaft comes into contact with the thrust fixation part along the rotational axis. According to the power unit of the present invention, the engine-side shaft comes into contact with the thrust fixation part. Accordingly, the positions of the first rotor and the second rotor in the axial direction are set to predetermined positions via the power-generator-side shaft continuous with the engine-side shaft. A clearance between the stator and each of the first rotor and the second rotor can be thereby set to a predetermined length, and the power generation efficiency of the axial flux power generator can be improved.

Moreover, in the power unit of the present invention, the engine-side shaft comes into contact with the thrust fixation part by being biased by a biasing part. According to the power unit of the present invention, arranging the engine-side shaft at a predetermined position by using a biasing force of the biasing part enables the first rotor and the second rotor to be arranged at the predetermined positions in the axial direction under a running condition of the power unit.

Furthermore, in the power unit of the present invention, the biasing part is a piston part that uses a hydraulic circuit of the engine. According to the power unit of the present invention, adopting the piston part that uses the hydraulic circuit of the engine as the biasing part allows the first rotor and the second rotor to be arranged at the predetermined positions by using the drive force of the engine.

Moreover, in the power unit of the present invention, the piston part has a substantially-arch shape. According to the power unit of the present invention, the piston part having the arch shape can more stably bias the rotating engine-side shaft.

Furthermore, in the power unit of the present invention, the biasing part is a spring. According to the power unit of the present invention, adopting the spring as the biasing part allows the first rotor and the second rotor to be arranged at the predetermined positions simply.

Moreover, in the power unit of the present invention, the engine-side shaft includes a first thrust contact part arranged at a position close to the axial flux power generator and a second thrust contact part arranged at a position farther away from the axial flux power generator than the first thrust contact part is, and the biasing part biases the first thrust contact part to bring the second thrust contact part into contact with the thrust fixation part. According to the power unit of the present invention, bringing the second thrust contact part of the engine-side shaft into contact with the thrust fixation part can fix the engine-side shaft at the predetermined position in the running of the engine. Accordingly, the first rotor and the second rotor connected to the engine-side shaft can be arranged at the predetermined positions in the axial direction.

Moreover, in the power unit of the present invention, the first thrust contact part and the second thrust contact part are parts in which a diameter of the engine-side shaft is partially increased. According to the power unit of the present invention, forming the first thrust contact part and the second thrust contact part as diameter increased parts allows the engine-side shaft that rotates in the running of the power unit to be effectively pressed in the axial direction.

Furthermore, a power unit of the present invention includes an engine, an axial flux power generator configured to be driven by the engine, and a thrust fixation part, wherein the engine includes an engine-side shaft configured to output a drive force by rotating about a rotational axis, the axial flux power generator includes a stator, a rotor arranged near the stator, and a power-generator-side shaft that is connected to a rotation center of the rotor and that is continuous with the engine-side shaft, the engine-side shaft comes into contact with the thrust fixation part along the rotational axis, the engine-side shaft comes into contact with the thrust fixation part by being biased by a biasing part, the engine-side shaft includes a first thrust contact part arranged at a position close to the axial flux power generator and a second thrust contact part arranged at a position farther away from the axial flux power generator than the first thrust contact part is, and the biasing part comes into contact with the first thrust contact part and biases the first thrust contact part to bring the second thrust contact part into contact with the thrust fixation part. According to the power unit of the present invention, the engine-side shaft comes into contact with the thrust fixation part. Accordingly, the positions of the first rotor and the second rotor in the axial direction are also set to predetermined positions via the power-generator-side shaft continuous with the engine-side shaft. Thus, a clearance between the stator and each of the first rotor and the second rotor can be set to a predetermined length, and the power generation efficiency of the axial flux power generator can be improved.

Although the embodiment of the present invention has been explained above, the present invention is not limited to the embodiment, and can be changed within a scope not departing from the spirit of the present invention. Moreover, the modes described above may be combined with one another.

The power unit 10 can be applied to a flight apparatus. Specifically, a motor is driven by an electric power generated by the power unit 10, and thrust obtained by rotating a rotor with a rotating force of the motor lifts a vehicle body.

The flight apparatus with such a configuration is also referred to as series hybrid drone.

EXPLANATION OF THE REFERENCE NUMERALS 10 power unit
11 engine
12 axial flux power generator
131 thrust fixation part
132 thrust fixation part
14 rotational axis
15 engine-side shaft
151 pin part
152 arm part
153 front extending part
154 rear extending part
16 stator
17 first rotor
18 second rotor
19 power-generator-side shaft
20 biasing part
21 piston part
22 spring
23 first thrust contact part
24 second thrust contact part
25 casing
26 piston
27 connecting rod
28 stator fixation part
29 piston housing portion
30 hydraulic circuit
31 insertion hole
39 engine
40 first engine part
41 second engine part
42 first crankshaft
43 first piston
44 first connecting rod
45 second crankshaft
46 second piston
47 second connecting rod
48 combustion chamber
49 cylinder

The invention claimed is:

1. A power unit comprising:
an engine;
an axial flux power generator configured to be driven by the engine; and
a thrust fixation part, wherein
the engine includes an engine-side shaft configured to output a drive force by rotating about a rotational axis,
the axial flux power generator includes a stator, a first rotor rotatably arranged on one side of the stator, a second rotor rotatably arranged on the other side of the stator, and a power-generator-side shaft that is connected to rotation centers of the first rotor and the second rotor and that is continuous with the engine-side shaft, and
the engine-side shaft comes into contact with the thrust fixation part along the rotational axis, and
the engine-side shaft comes into contact with the thrust fixation part by being biased by a biasing part, and
the engine-side shaft includes a first thrust contact part arranged at a position close to the axial flux power generator and a second thrust contact part arranged at a position farther away from the axial flux power generator than the first thrust contact part is, and
the biasing part biases the first thrust contact part to bring the second thrust contact part into contact with the thrust fixation part.

2. The power unit according to claim 1, wherein the biasing part is a piston part that uses a hydraulic circuit of the engine.

3. The power unit according to claim 2, wherein the piston part has a substantially-arch shape.

4. The power unit according to claim 1, wherein the biasing part is a spring.

5. The power unit according to claim 1, wherein the first thrust contact part and the second thrust contact part are parts in which a diameter of the engine-side shaft is partially increased.

6. A power unit comprising:
an engine;
an axial flux power generator configured to be driven by the engine; and
a thrust fixation part, wherein
the engine includes an engine-side shaft configured to output a drive force by rotating about a rotational axis,
the axial flux power generator includes a stator, a rotor arranged near the stator, and a power-generator-side shaft that is connected to a rotation center of the rotor and that is continuous with the engine-side shaft,
the engine-side shaft comes into contact with the thrust fixation part along the rotational axis,
the engine-side shaft comes into contact with the thrust fixation part by being biased by a biasing part,
the engine-side shaft includes a first thrust contact part arranged at a position close to the axial flux power generator and a second thrust contact part arranged at a position farther away from the axial flux power generator than the first thrust contact part is, and
the biasing part comes into contact with the first thrust contact part and biases the first thrust contact part to bring the second thrust contact part into contact with the thrust fixation part.

\* \* \* \* \*